(12) United States Patent
Muller et al.

(10) Patent No.: US 6,802,512 B2
(45) Date of Patent: Oct. 12, 2004

(54) SEALING BODY FOR LONGITUDINALLY SPLIT CABLE FITTINGS

(75) Inventors: Thorsten Muller, Menden (DE); Rainer M. Zimmer, Schalksmuhle (DE)

(73) Assignee: CCS Technology, Inc., Wilmington, DE (US)

(*) Notice: Subject to any disclaimer, the term of this patent is extended or adjusted under 35 U.S.C. 154(b) by 43 days.

(21) Appl. No.: 10/149,156

(22) PCT Filed: Nov. 29, 2000

(86) PCT No.: PCT/DE00/04243

§ 371 (c)(1),
(2), (4) Date: May 31, 2002

(87) PCT Pub. No.: WO01/41276

PCT Pub. Date: Jun. 7, 2001

(65) Prior Publication Data

US 2002/0180163 A1 Dec. 5, 2002

(30) Foreign Application Priority Data

Dec. 2, 1999 (DE) .......................................... 199 58 112
Mar. 3, 2000 (DE) .......................................... 100 10 452

(51) Int. Cl.[7] .................................................. F16L 5/02
(52) U.S. Cl. ...................... 277/607; 277/616; 277/626; 277/631; 174/65 SS; 174/92
(58) Field of Search ................................. 277/607, 609, 277/616, 626, 631, 632; 174/92, 93, 65 R, 61, 63, 64, 65 SS; 248/56

(56) References Cited

U.S. PATENT DOCUMENTS

| | | | | |
|---|---|---|---|---|
| 3,564,113 A | * | 2/1971 | Kindler | .................. 174/65 G |
| 4,377,291 A | * | 3/1983 | Albertini | .................... 277/619 |
| 5,006,669 A | * | 4/1991 | Bachel et al. | ................ 174/93 |
| 5,162,772 A | * | 11/1992 | May | ............................ 336/92 |
| 5,355,109 A | * | 10/1994 | Yamazaki | .................... 336/92 |
| 5,374,017 A | * | 12/1994 | Martin et al. | ................ 248/56 |
| 5,545,854 A | * | 8/1996 | Ishida | .................... 174/153 G |
| 5,728,974 A | * | 3/1998 | Kitoh et al. | ............ 174/65 SS |
| 5,753,863 A | * | 5/1998 | Grajewski et al. | .......... 174/151 |
| 5,775,702 A | * | 7/1998 | Laeremans et al. | ......... 277/314 |
| 5,942,964 A | * | 8/1999 | Takeuchi | ..................... 336/92 |
| 6,046,406 A | * | 4/2000 | Milanowski et al. | ..... 174/77 R |
| 6,051,792 A | * | 4/2000 | Damm et al. | ................ 174/93 |
| 6,211,465 B1 | * | 4/2001 | Streit | ....................... 174/65 G |
| 6,248,953 B1 | * | 6/2001 | Miller | ...................... 174/74 R |
| 6,290,236 B1 | * | 9/2001 | Hagmann | ................... 277/602 |
| 6,297,447 B1 | * | 10/2001 | Burnett et al. | ......... 174/40 CC |
| 6,344,615 B1 | * | 2/2002 | Nolf et al. | .................... 174/92 |
| 6,394,464 B1 | * | 5/2002 | Moreau | ...................... 277/603 |
| 6,575,474 B1 | * | 6/2003 | Zimmer et al. | ............. 277/603 |

FOREIGN PATENT DOCUMENTS

| | | | | |
|---|---|---|---|---|
| EP | 0219072 A2 | 4/1987 | ......... | H02G/15/013 |
| EP | 0408967 A2 | 1/1991 | ......... | H02G/15/013 |
| EP | 0923178 A2 | 6/1999 | ......... | H02G/15/013 |

* cited by examiner

Primary Examiner—Alison K. Pickard

(57) ABSTRACT

The inventive sealing body (DK) is comprised of a number of segments (DS1, DS2, DS3) in whose sealing chambers (DKAA, DKAM) a sealing block (DBAS, DBMS) is arranged that is made of an easily deformable, in particular, gel-like substance. Tabs (ZE) which conically extend toward one another serve to center the cable which is inserted into the sealing body (DK) and held therein. Wedges (K) which can be actuated from the outside act upon assigned pressure elements (DE), which deform the corresponding sealing block (DBAS, DBMS) thus displacing the gel-like substance in a radial direction.

17 Claims, 10 Drawing Sheets

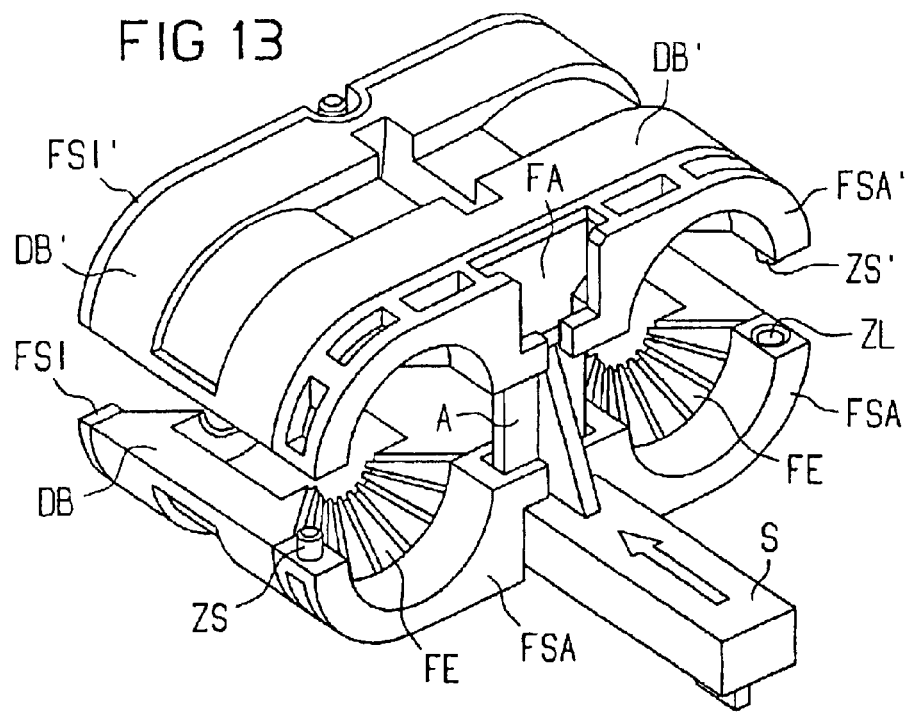
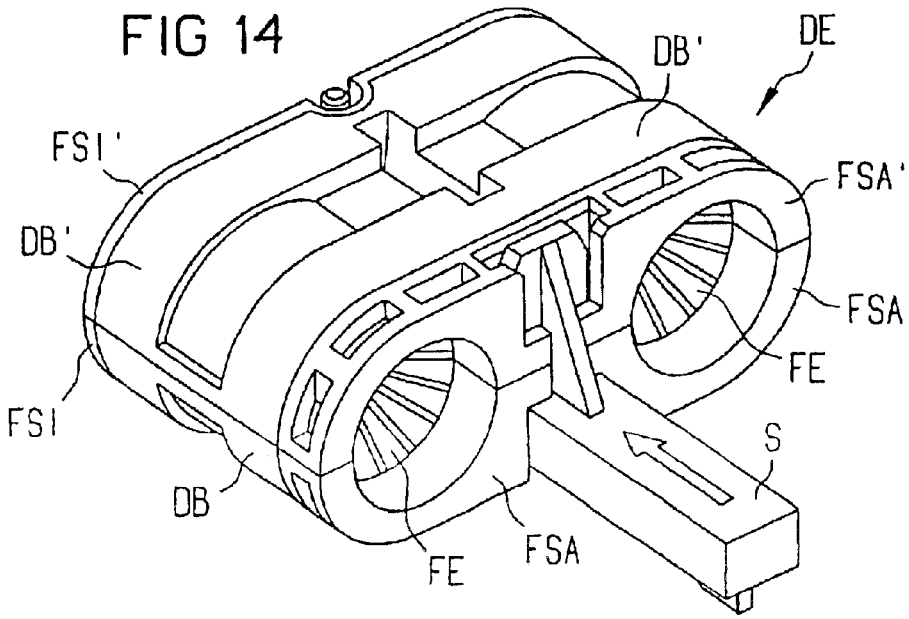

SEALING BODY FOR LONGITUDINALLY SPLIT CABLE FITTINGS

FIELD OF THE INVENTION

The invention relates to a sealing body for longitudinally split cable fittings comprising a number of segments.

BACKGROUND OF THE INVENTION

A sealing body for longitudinally split cable fittings for insertion into a singly split sleeve tube is known from EP 0 408 967 A. The sealing body is multiply split, seen in the direction of insertion, with cable insertion openings being arranged in the separating planes. A cable holding device, which are formed by pressure plates and are guided in a wedge-like chamber, is also arranged. These pressure plates are pressed onto the inserted cables, so that tensile or compressive forces acting on the cables can be absorbed.

Also known are sealing bodies which initially have a closed surface and into which cable insertion openings are only cut or drilled when they are required. However, this proves to be laborious and is very time-intensive. What is more, the sealing of the separating planes between the cable and the surrounding walls of the sealing body is difficult and is usually accomplished by additionally applying sealing materials. If cable insertion openings are already present, the sealing material must be adapted precisely to the respective cable diameter when creating the seal. This has the result that there are considerable sources of error. What is more, the closing of the sealing body segments in the case of split sealing bodies is a very elaborate installation procedure, since an exact mutual fit must be ensured.

SUMMARY OF THE INVENTION

For the present invention the object is to provide a sealing body for cable fittings which is of a segmented construction, with which simple, quick and error-free installation of the individual sealing body segments is ensured, and with which the sealing can also be performed in a simple and reliable way. The set object is achieved according to the invention with a sealing body of the type explained at the beginning by the sealing body segments having latching elements acting upon one another, by deformable sealing blocks being arranged in the regions of the cable insertion openings, by pressure elements being provided, which elements bear against the sealing blocks and can be pressed against the latter by pressure-exerting elements, with the sealing blocks being deformed, in order to press the sealing blocks against a placed-in cable and against the sealing body segments, with the sealing blocks for their part sealing the cable insertion openings, by at least one spring disk with spring elements directed conically into the cable insertion openings being arranged for deforming the sealing blocks, and by guides being arranged in the region of each cable insertion opening, into which guides there are inserted sliding pieces which can be displaced perpendicularly with respect to the direction of cable insertion, to which sliding pieces an inserted cable can be fastened for holding the latter.

The sealing body according to the invention, which is split in the direction of insertion, comprises at least two, preferably three, sealing body segments, each sealing body segment having already prefabricated cable insertion openings in a way corresponding to the next-adjacent sealing body segment. What is more, sealing material in the form of deformable sealing blocks, preferably of a gel-like sealing compound, is already integrated in the regions of the cable insertion openings. For better handling and for avoiding loose parts, the sealing body segments have integrated guides, which are formed by a guiding groove and a spring strip sliding therein. This has the effect that the individual sealing body segments can be displaced with respect to one another during the installation and insertion of the cables. Furthermore, arranged on the outer side of the sealing body, at the cable insertion openings, are centering devices comprising tabs resiliently converging conically inward, by which centering of the inserted cables within the cable insertion openings takes place. The sealing blocks of deformable sealing material or sealing compound, inserted in the regions of the cable insertion openings, are laterally bounded by at least one spring disk, this spring disk being provided in the regions of the cable lead-ins with spring elements which are directed conically toward the sealing blocks and exert pressure on the sealing blocks during closing of the sealing body. As a result, a laterally acting pressure takes place in addition to the pressure exerted by the pressure elements, so that the deformable sealing compound is pressed in a sealing manner against the inserted cables. Here, too, these spring elements additionally have a centering effect on the inserted cables. The exertion of the pressure on the pressure element for deforming the sealing compound takes place with the aid of a wedge, which acts by pressing on the pressure element, as explained in more detail later. On the inner side of the sealing body there are in the regions of the cable insertion openings guides into which cable holding devices, applied to the cables, can be inserted in a sliding manner perpendicularly with respect to the cable insertion opening. The sliding within the guides allows adaptation to the respective cable diameter. The closing of the sealing body according to the invention takes place by pushing the individual sealing body segments together, with guides and latching elements serving for the mutual fixing. The latching elements additionally have outwardly directed, concealed unlocking lugs, so that reopening can be made possible in the case of subsequent cable installation. Centering studs, which prevent the individual sealing body segments from twisting with respect to one another, are also arranged. Unused cable insertion openings are closed in a simple way with filler plugs. These filler plugs are shaped in such a way that in each case the complete cable insertion opening is closed and, in this way, the sealing material lying behind is protected from external influences. For fastening the sealing body, and consequently the cable fitting, to a catenary wire, mast or wall, fastening elements are provided on the outer side. Provided in the inner region of the sealing body are fastening points, to which connecting rails can be attached for the mutual fixing of the sealing bodies at the ends. The sealing body according to the invention serves overall for creating the end seal of a sleeve housing, which typically comprises a longitudinally split sleeve tube, which has closure elements along its longitudinal split.

BRIEF DESCRIPTION OF THE DRAWINGS

FIG. 13 shows the pressing mechanism represented in FIG. 12 and the corresponding pressing mechanism of the middle sealing body segment before the two components are joined together and FIG. 14 shows the joined-together sealing elements of the outer sealing body segment and of the middle sealing body segment.

DETAILED DESCRIPTION OF THE INVENTION

Figure 1:
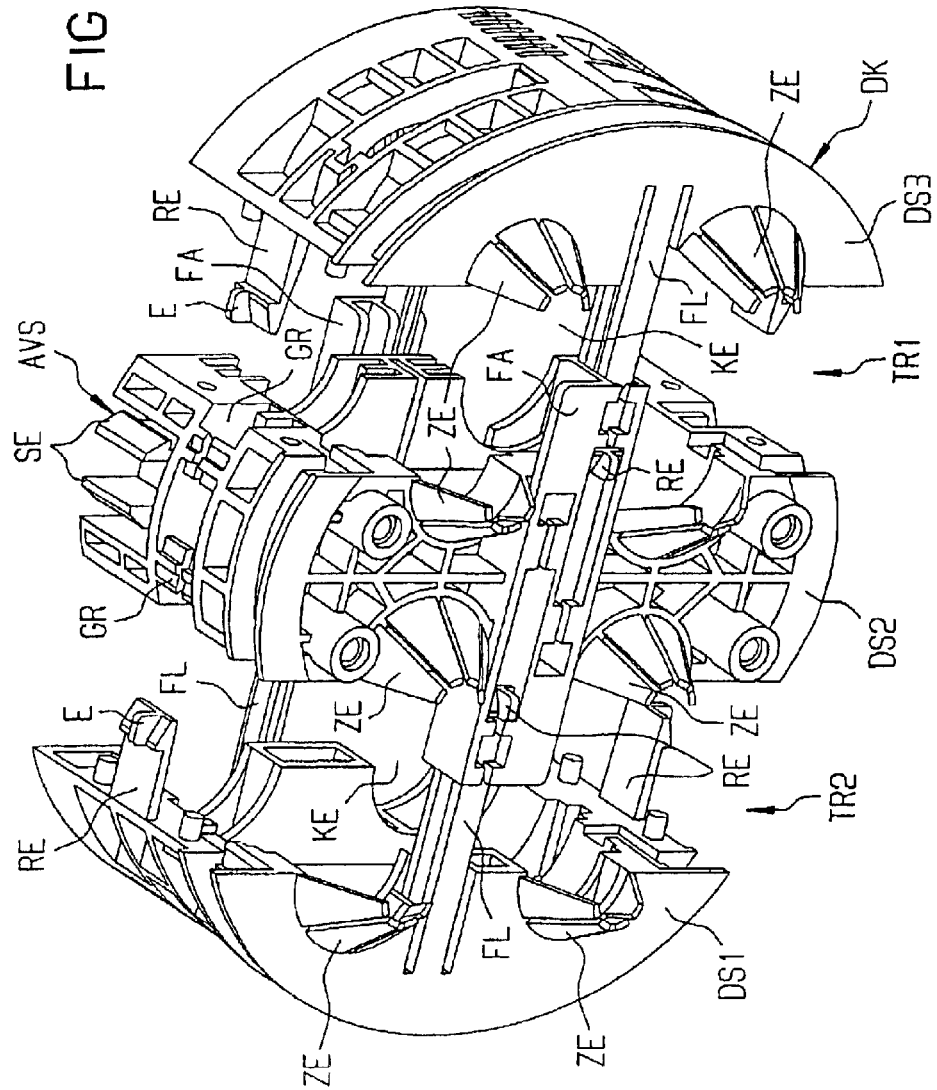
FIG. 1 shows the sealing body in the opened state.

Represented in FIG. 1 is a sealing body DK according to the invention comprising three sealing body segments DS1, DS2 and DS3, shown here in the open state. The middle sealing body segment DS2 is provided on the side directed outward in the fitted state with a guiding receptacle FA, into which guiding strips FL with latching elements RE of the outer sealing body segments DS1 and DS3 are pushed until they engage in the end position. It is ensured by this guide that the positional assignment is already fixed in the installation operation, making assembly much easier for the installation engineer. The splitting of the sealing body DK into three sealing body segments DS1, DS2 and DS3 produces two separating planes TR1 and TR2, arranged in which there are here, in each case, two already open cable insertion openings KE, so that the previously customary cutting out or drilling for producing cable insertion openings is no longer needed. The peripheral edges of the cable insertion openings KE are provided with centering devices, which in this example comprise outwardly protruding, pointed tabs ZE, these tabs ZE being arranged such that they conically constrict the cable insertion openings KE. During the insertion of the cables, the latter are centered by the resilient tabs ZE within the cable insertion openings KE. This also makes installation significantly easier. Furthermore, in addition to the centrally arranged latching mechanisms comprising guiding strips FL with latching elements RE, also arranged in the same way on the outer sealing body segments DS1 and DS2 are latching elements RE, which engage in corresponding mating latches GR of the middle sealing body segment DS2 when the sealing body DK is closed. This measure and latching formations in turn make installation easier, since additional bracing means are not required, at least not in the installation operation. To allow the sealing body segments DS1, DS2 and DS3 also to be detached from one another again if need be, attached to the latching elements RE are corresponding unlocking lugs E, which can be pressed in and thereby release the locking. Arranged in the middle sealing body segment DS2 is an attachment means AVS for connecting rails, which in this case is formed by resilient snap elements. The associated connecting rail is fixed by snapping-in.

Figure 2:
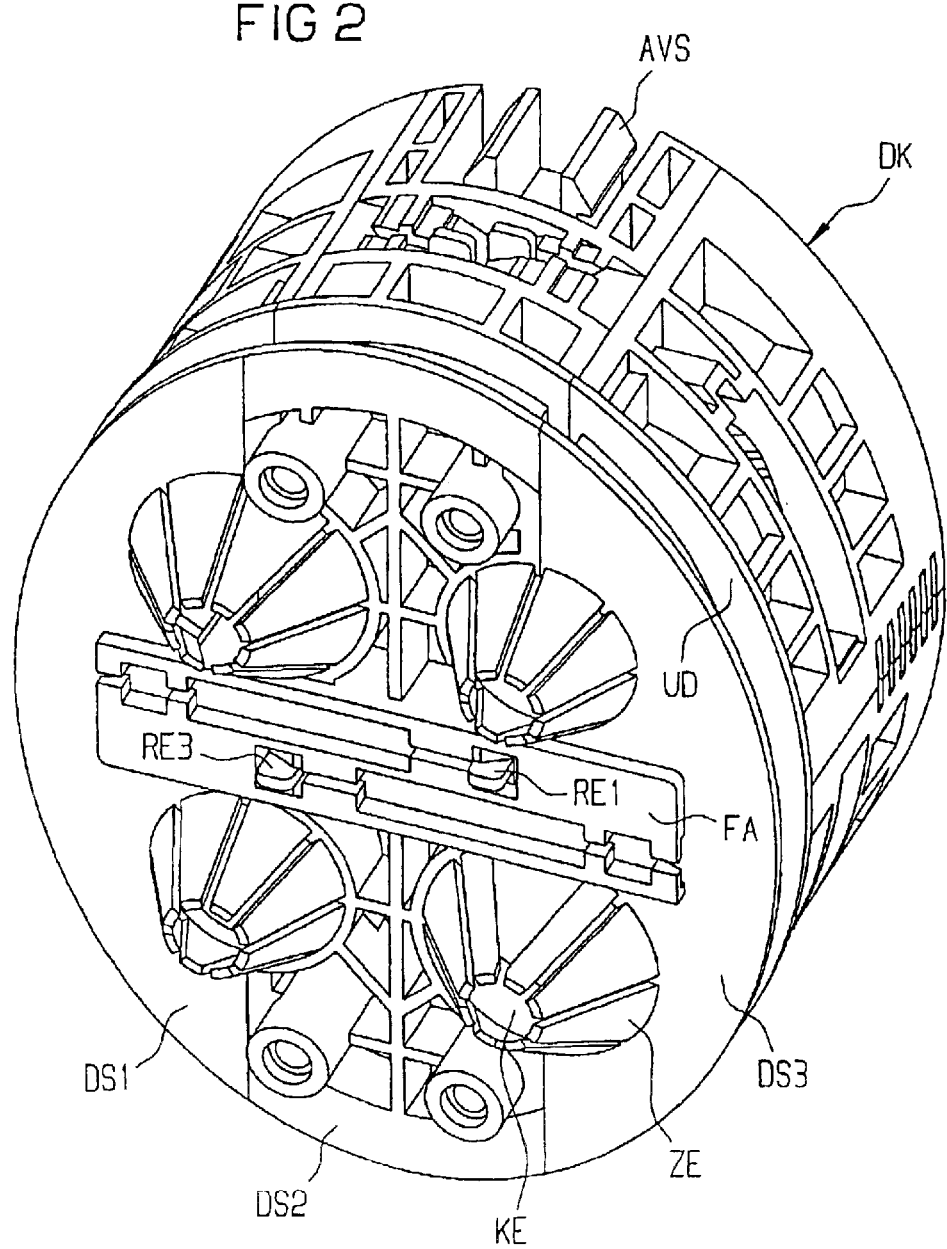
FIG. 2 shows the sealing body in the closed state.

FIG. 2 shows the sealing body DK in the closed state, revealing that a peripheral sealing groove UD is formed, into which an annular seal is inserted for sealing with respect to the sleeve tube to be pulled on later. The three sealing body segments DS1, DS2 and DS3 are already fixed to one another by the latching elements, although here it is only possible to see the latching elements RE1 and RE3, which are engaged in the guiding receptacle FA. The cable lead-ins KE are surrounded by the conically converging tabs ZE of the centering devices.

Figure 3:
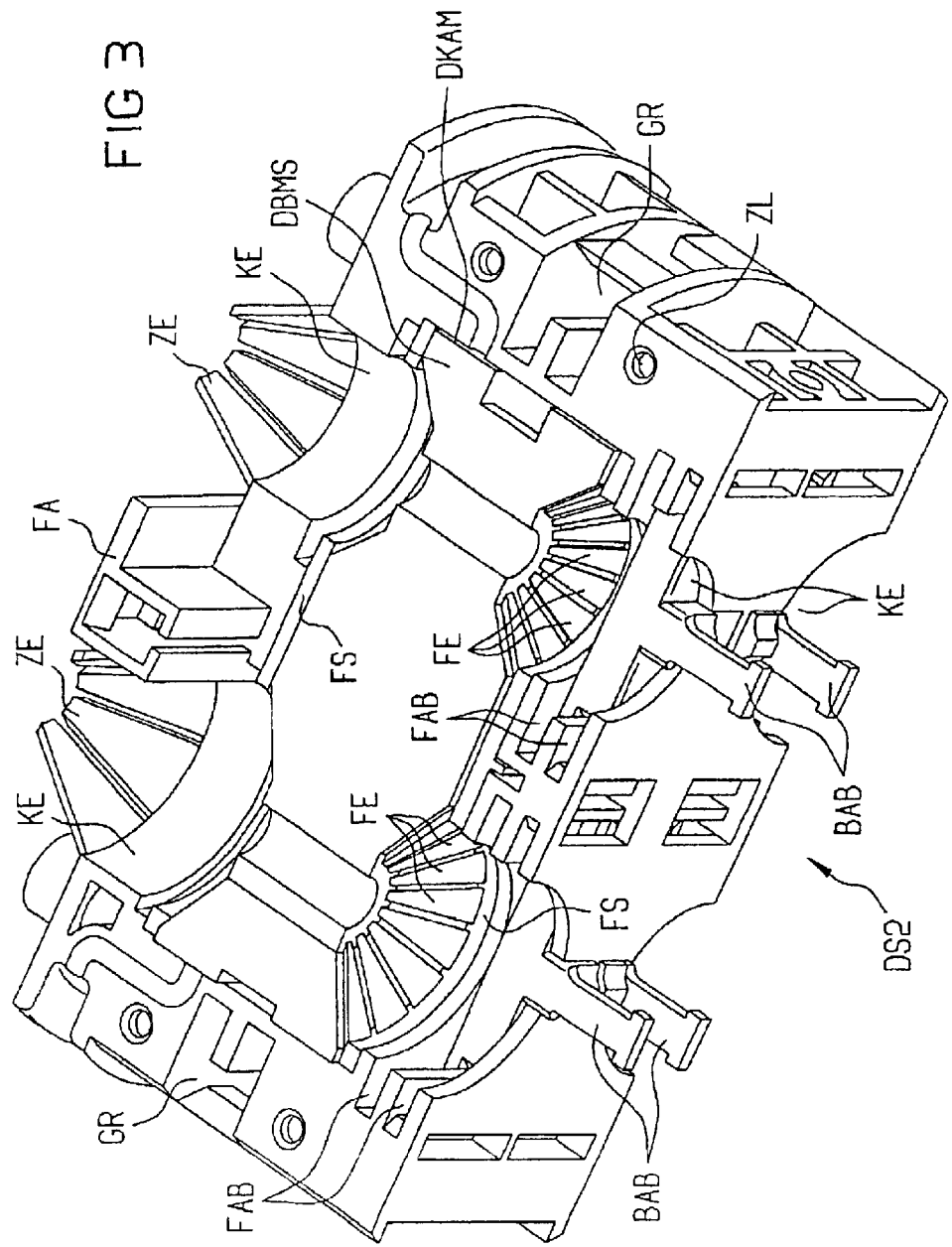
FIG. 3 shows the middle sealing body segment.

FIG. 3 shows the middle sealing body segment DS2, in the inner sealing chamber DKAM of which there is placed a sealing block DBMS of deformable, preferably gel-like, sealing material. In the regions of the cable lead-ins KE, the sealing block DKAM is in each case provided with inwardly directed conically extending depressions, into which tab-shaped spring elements FE of an inner spring disk FS and an outer spring disk FS' act when the sealing body as a whole is closed, i.e. pressed together. Furthermore, the centering devices with the resilient tabs ZE at the cable lead-ins KE, the guiding receptacle FA for receiving the guiding strips of the outer sealing body segments and the mating latches GR for the latching elements of the outer sealing body segments can be seen. Arranged on the side of the middle sealing body segment DS2 that is directed inward during the fitting of the sealing body, in the regions of the cable lead-ins KE, are protruding brackets BAB, on which cable holding devices, which are attached to the inserted cables, or the cables themselves are clamped. The cable holding devices fastened to the cables have laterally protruding lamella-like lugs, which are inserted into the slit-like guides FAB of the middle sealing body segment DS2. The position of these cable holding devices can be adapted in the guides FAB for adaptation to the diameter of the respectively inserted cable by displacement perpendicularly with respect to the direction of insertion. The cable holding devices are known per se and essentially comprise the lateral lamella-like lugs, which are pressed onto the cables with the aid of straps. The insertion into the guides FAB and the fastening to the tabs FAB by cable ties, as they are known, allow compressive, tensile and torsional forces to be absorbed. During the assembly of the sealing body, centering holes ZL are entered by corresponding centering studs of the outer sealing body segments.

Figure 4:
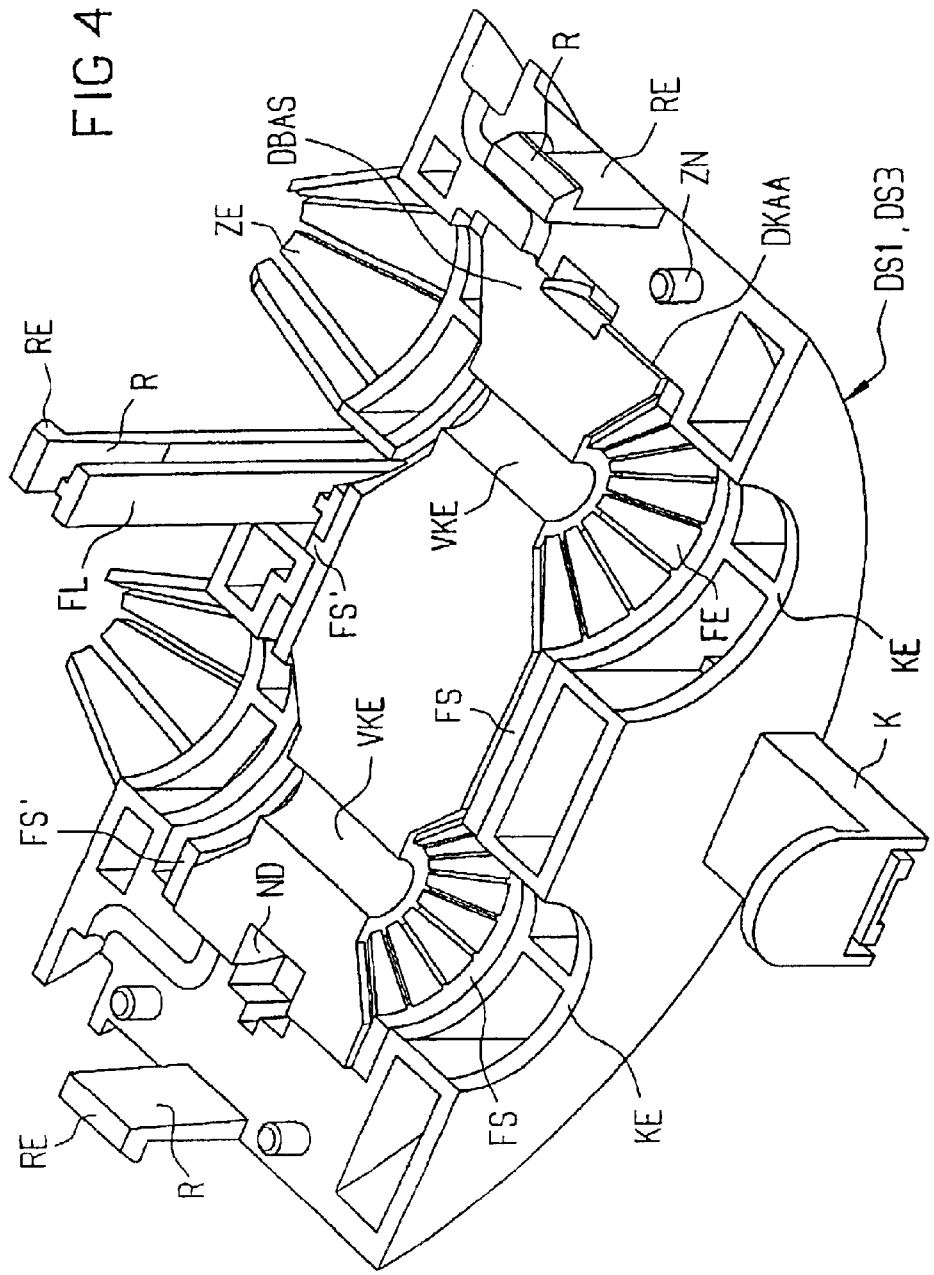
FIG. 4 shows an outer sealing body segment.

FIG. 4 shows an outer sealing body segment DS1 or DS3 with a sealing block DBAS placed into the outer sealing chamber DKAA. In the regions of the cable lead-ins KE, the sealing block DBAS has in each case in the separating plane preformed cable lead-ins VKE, these being deformed in a way corresponding to the cable diameter during the later pressing. Here, too, two pairs of respectively tab-shaped spring elements protrude into conically extending depressions of the sealing block DBAS. When the sealing body is closed, a deformation corresponding to the diameters of the inserted cables takes place, the deformable sealing compound or sealing material undergoing additional pressure exerted by the spring elements FE of the two spring disk FS/FS'. Furthermore, these spring elements FE have a centering effect on the respective cable and also prevent the deformable sealing material from flowing away from the sealing region. Each sealing block, here the sealing block DBAS, is provided on its outer side with a peripheral groove ND, into which a pressure element can act from the outside on the sealing block for the deformation, as explained later. This pressure element is moved by an externally acting wedge K inward in the direction [lacuna] sealing block or in the direction of the cables. Arranged near the outer, peripheral edge of the sealing body segments DS1, DS3 are latches R with latching elements RE, which serve for the locking with the middle sealing body segment. During assembly, the centering studs ZN protrude into corresponding centering holes of the middle sealing body segment. The guiding strip FL, the latch R with the latching element RE engage during assembly in the guiding receptacle of the middle sealing body segment. Here, too, the halves of the centering devices comprising the conically extending tabs ZE can be respectively seen.

Figure 5:
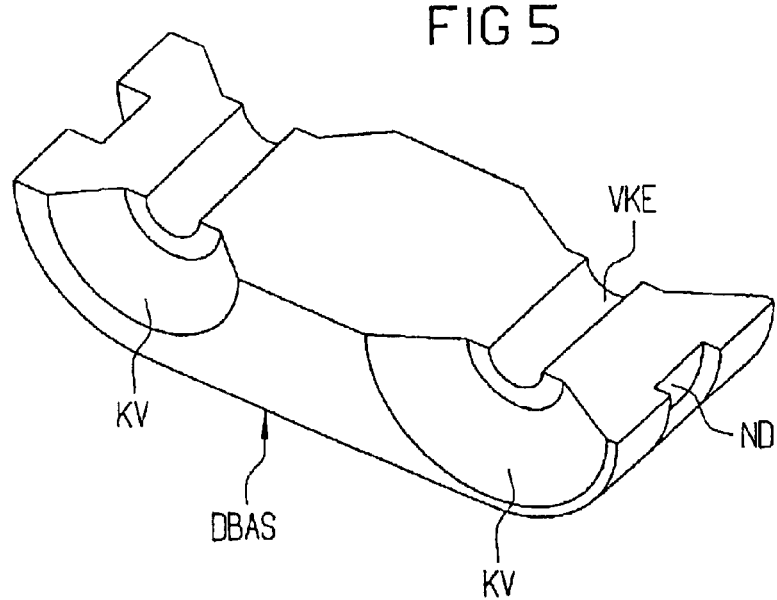
FIG. 5 shows a sealing block for an outer sealing body segment.

Represented in FIG. 5 is a sealing block DBAS for an outer sealing body segment, two of these sealing blocks and a correspondingly similar middle sealing block, as represented in FIG. 3, being put together to form the complete sealing block. Here, the conical depressions KV, made in the cable insertion regions, for receiving the spring elements of the two spring disks, and in each case the preformed, but not adapted path of the cable lead-ins VKE, can be seen. A substance or a substance combination of a gel-like consistency, such as polyurethane for example, is preferably used as the deformable sealing material.

Figure 6:
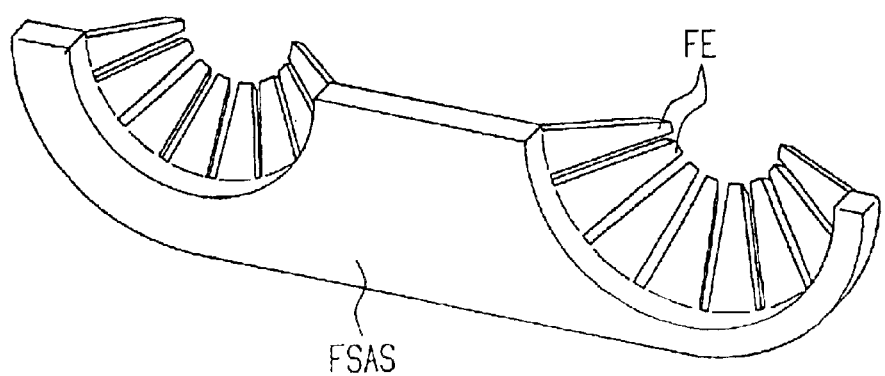
FIG. 6 shows a spring disk.

Represented in FIG. 6 is a split spring disk FSAS, which is designed for two parallel cable lead-ins. The splitting in half of this spring disk FSAS corresponds to the splitting of the sealing body segments, the spring disk for the middle sealing body segment having two half-circles of spring elements lying one on top of the other. This has the effect of respectively completing a full circle and that the conical depressions of the assembled sealing body blocks are fully occupied by the spring elements FE.

Figure 7:
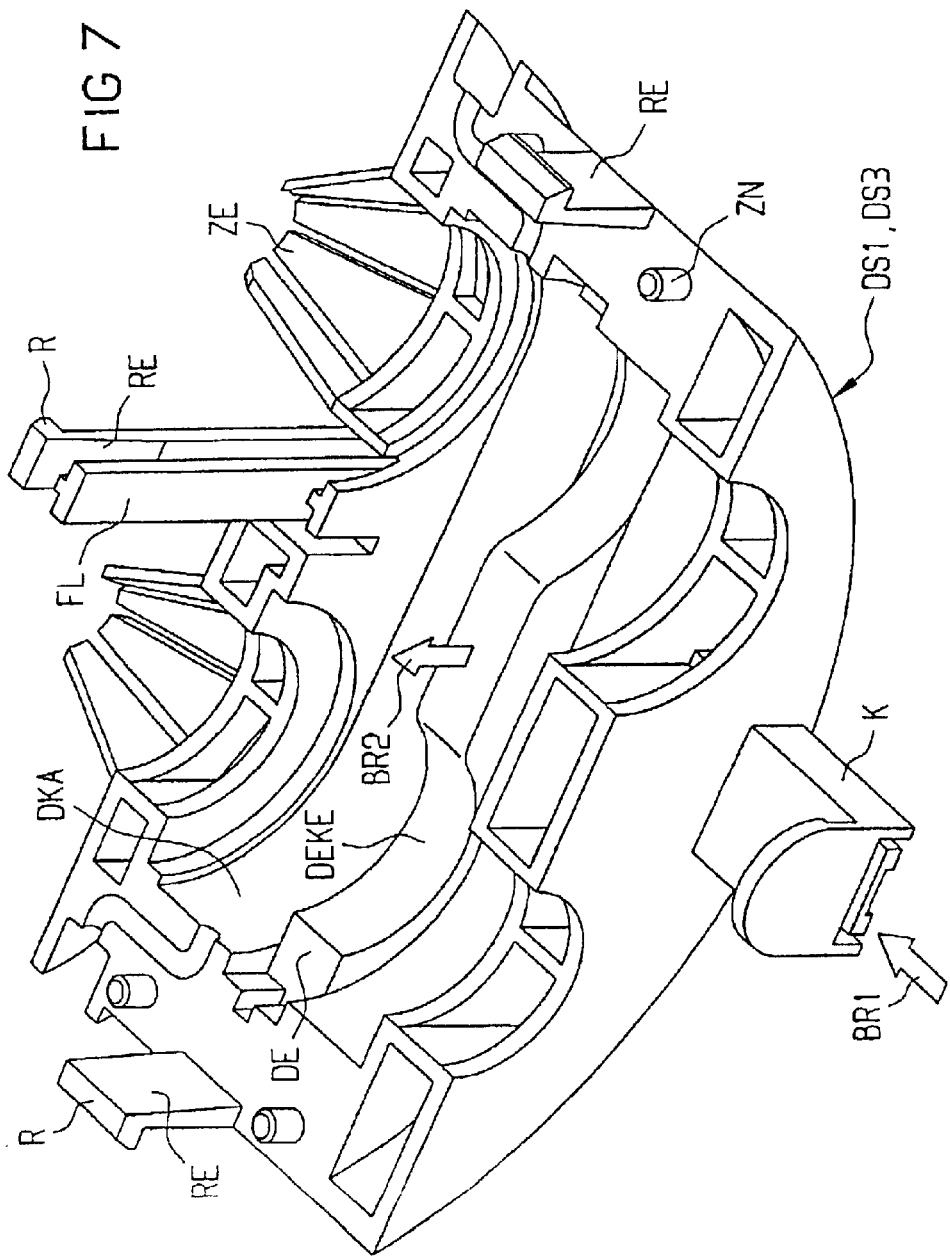
FIG. 7 shows the insertion of a pressure element in an outer sealing body segment.

FIG. 7 shows an outer sealing body segment DS1 or DS2 without sealing block, with an open sealing chamber DKA, so that the pressure element DE located under the sealing body block is visible. This pressure element DE has, in a way corresponding to the regions for cable lead-ins, clearances DEKE, which are designed such that, even in the case of a large cable diameter, sealing material still remains between the pressure element DE and the cable. The pressure element DE is driven inward in the direction of the inserted cables by pressing-in of a wedge K in the direction BR1 perpendicular thereto, in the direction BR 2, into the sealing chamber DKA, the sealing material being correspondingly deformed to create the necessary seal. The spring disks, not shown here, form the lateral boundaries for the sealing material.

Figure 8:
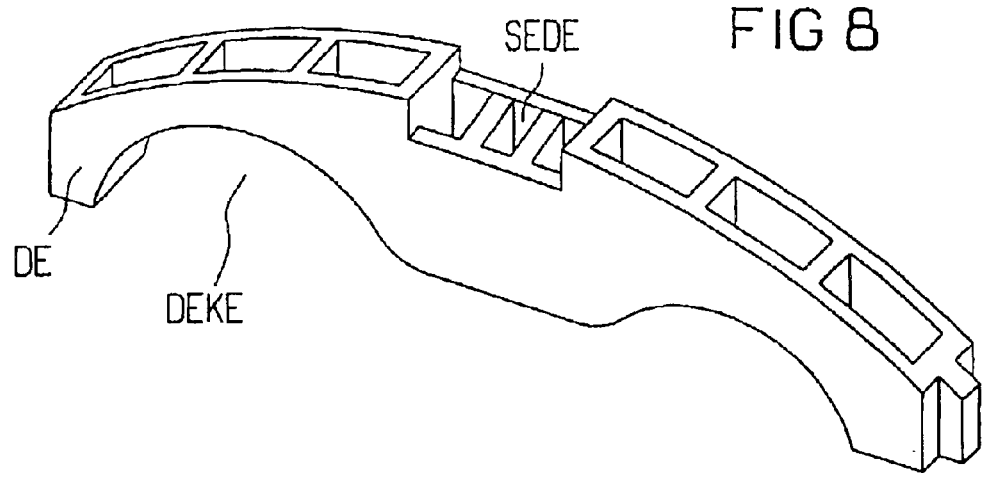
FIG. 8 shows a pressure element.

FIG. 8 shows a pressure element DE with the cable lead-ins DEKA designed for maximum cable diameter, as used in the outer sealing body segments. Formed in the outer middle region of the pressure element DE is an incision with an oblique plane SEDE, on which the wedge shown in FIG. 7 acts for changing the direction of the force.

Figure 9:
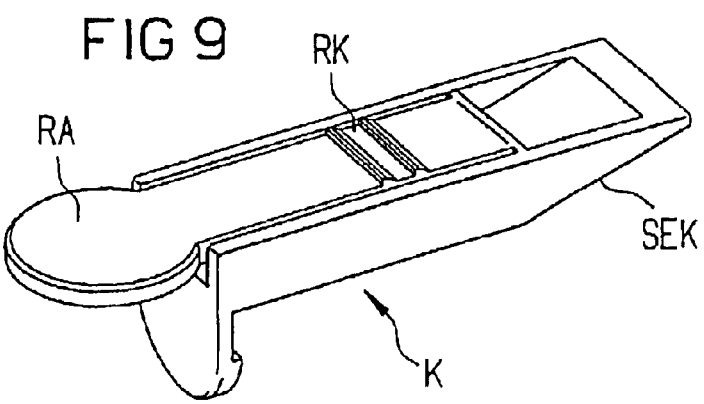
FIG. 9 shows a wedge with covering for the actuation of the pressure element.

FIG. 9 shows a wedge K, which has an oblique plane SEK, with which the effect on the oblique plane of the pressure element takes place. The wedge K is provided with latches RK, which are partly concealed here, for example by a latch covering RA.

Figure 10:
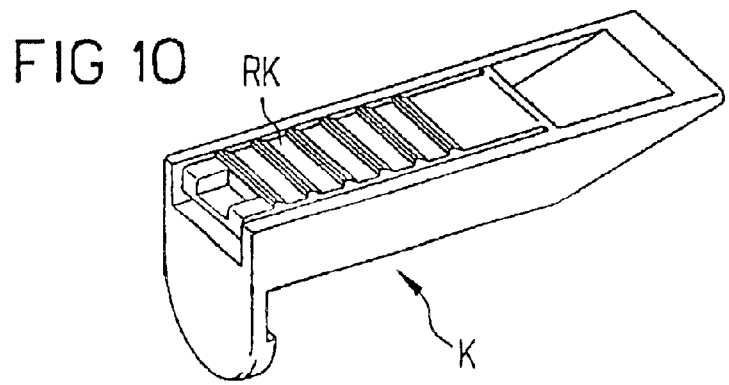
FIG. 10 shows a wedge without covering.

FIG. 10 shows the wedge K with latches RK, with the covering removed.

Figure 11:
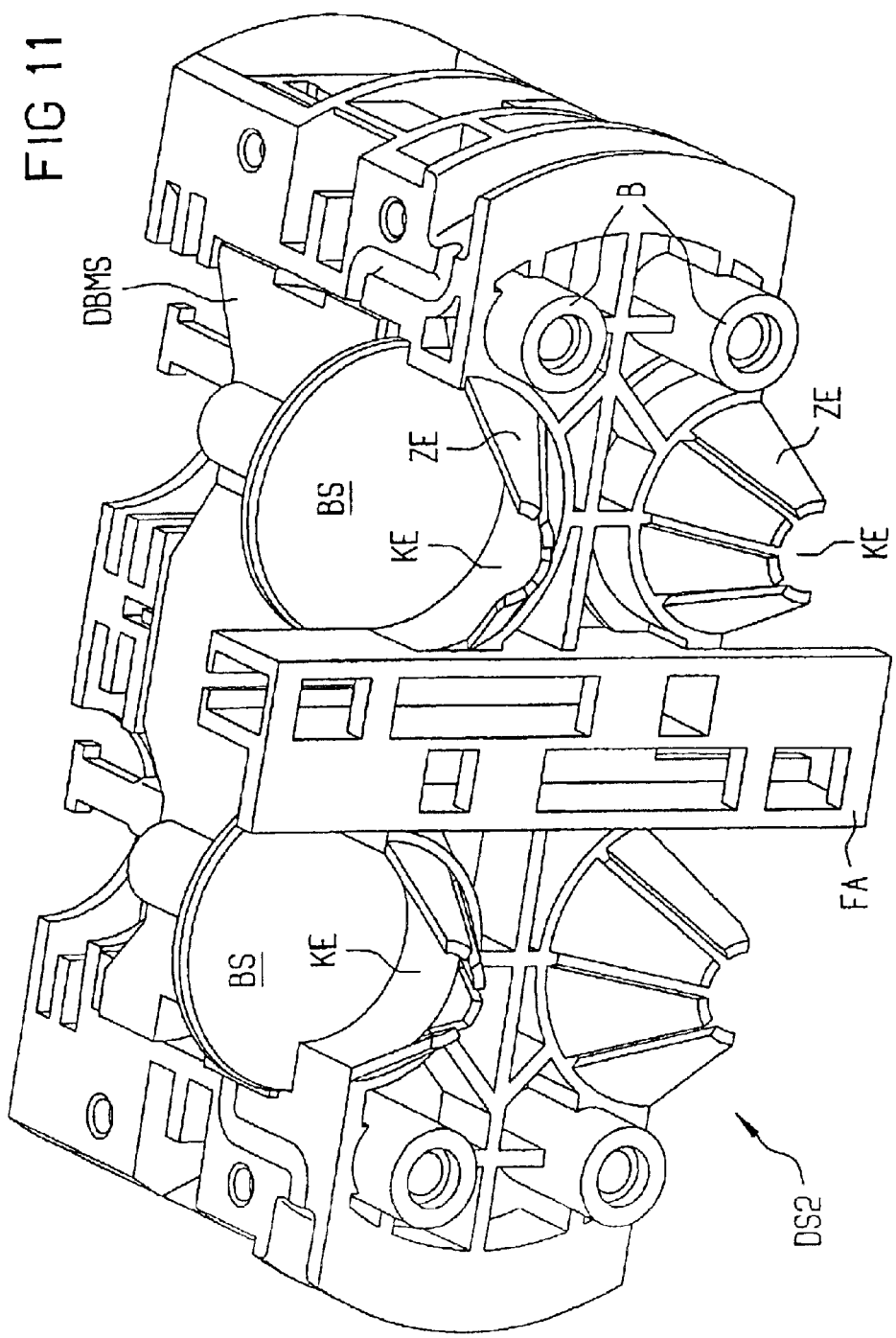
FIG. 11 shows the insertion of filler plugs in the cable insertion openings of the middle sealing body segment.

FIG. 11 shows once again the middle sealing body segment DS2, here the two upper cable insertion openings KE being closed with filler plugs BS, since it is intended for example that they are not yet to be occupied. This makes sure that the sealing blocks lying behind—here only the sealing block DBMS is visible—is not pressed out of the unoccupied cable insertion openings when the sealing body is closed. Furthermore, it is shown that various fastening means B are arranged in the front side, at which or by which fastenings to walls, masts or catenary wires can be performed.

In the case of the exemplary embodiments described so far, the sealing of the cables inserted into the sealing body and held there is achieved by the radial pressing of the gel-like substance serving as sealing material. It goes without saying that reliable sealing of the cables can also be accomplished by means of a ram acting in the axial direction on the respective sealing block and displacing the gel-like substance in the radial direction, or by means of a plate-shaped or disk-shaped element.

Figure 12:
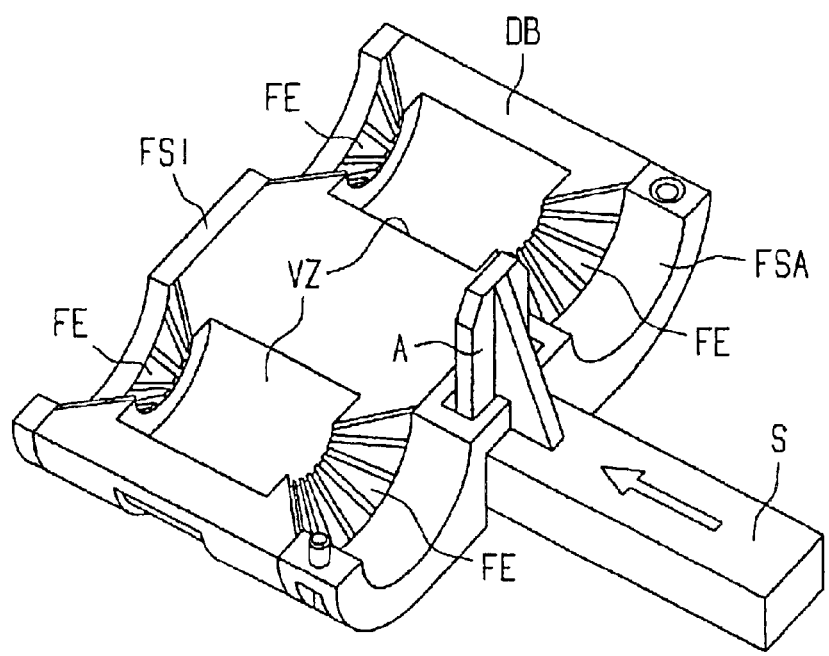
FIG. 12 shows an exemplary embodiment of a mechanism for the axial pressing of a block of sealing compound present in one of the outer sealing body segments.

As represented in FIG. 12, the corresponding mechanism, respectively present in the two outer sealing body segments DS1/DS2, may then comprise, for example, an outer spring disk FSA, which can be displaced in the axial direction, that is to say parallel to the longitudinal axis of the sealing body DK, a slide S, fastened to the outer spring disk FSA or non-positively connected to the spring disk FSA, and an inner spring disk FSI, supported on the sealing chamber wall. The form and construction of the spring disks FSA/FSI have already been explained with reference to FIG. 6. The sealing material arranged between the two spring disks FSA/FSI is again in the form of a block DB. The sealing block DB has two parallel-extending depressions VZ, which are adapted to the form of the cable and respectively merge with two conically outward-widening recesses (see also FIG. 5). The spring elements FE fastened to the two spring disks FSA/FSI and serving as a displacer, centering aid and run-out preventer engage with an exact fit into these recesses of the sealing block DB.

The lug A, fastened to the slide S, engages in a guide FA of the corresponding mechanism, present in the middle sealing body segment DS2, for the axial pressing of the sealing block DB' (see. FIG. 13). This mechanism is constructed mirror-symmetrically with respect to the pressing mechanism arranged in the outer sealing body segment DS1/DS3 and represented in FIG. 12, that is to say likewise comprises an outer spring disk FSA', an inner spring disk FSI' and the conically inward-converging spring elements fastened to the spring disks FSA'/FSI' but not visible here. Centering pins and holes ZS/ZS'/ZL make it easier for the two pressing mechanisms to be joined together with an exact fit to form the unit DE shown in FIG. 14, the sealing body DK represented in FIGS. 1 and 2 altogether containing two of these units DE.

Actuation of the slide S has the effect that the outer spring disks FSA/FSA', guided by the wall of the sealing chamber, are displaced simultaneously in the direction of the immovable inner spring disks FSI/FSI' assigned to them, and that the gel-like substance of the sealing blocks DB/DB' is consequently displaced in the radial direction. At the same time, the sealing compound exerts a counteracting force on the spring elements FE, so that the latter come to bear against the held cables and center them. What is more, the gaps present between respectively neighboring spring elements FE close, which prevents the sealing compound from escaping from the chamber.

Accordingly, what is claimed is:

1. A sealing body for longitudinally split cable fittings comprising a plurality of sealing body segments, in the separating planes of which cable insertion openings and integrated cable holding devices are arranged, at least one of the sealing body segments having one or more integrally formed latching elements that engage a respective guiding receptacle formed in another of the body segments, by means of which the respective sealing body segments are connected to one another in a latching manner, said sealing body further comprising deformable sealing blocks arranged in the regions of the cable insertion openings, each sealing block having an outer peripheral groove for receiving a pressure element, which pressure elements bear against the sealing blocks when pressed against the latter and deform said sealing blocks to press the sealing blocks against a placed-in cable and against the sealing body segments, with the sealing blocks sealing the cable insertion openings, said sealing body further comprising at least one spring disk with spring elements directed conically into the cable insertion openings and adapted for deforming the sealing blocks, and said sealing body comprising guides arranged in the region of each cable insertion opening for receiving sliding pieces adapted to be displaced perpendicularly with respect to the direction of cable insertion for holding an inserted cable.

2. The sealing body as claimed in claim 1, wherein said sealing blocks consist of a gel-like substance.

3. The sealing body as claimed in claim 1, wherein said spring elements of the spring disk are formed as pointed tabs.

4. The sealing body as claimed in claim 1, wherein said pressure elements have pressure surfaces facing the sealing blocks comprising arc-shaped clearances, and wherein the pressure elements are adapted to be pressed against the sealing blocks by means of latchable wedges, which can be pressed into corresponding oblique planes of the pressure elements.

5. The sealing body as claimed in claim 1, wherein two semi-circular sealing body segments with a separating plane are fitted together.

6. The sealing body as claimed in claim 1, wherein two part-circular outer sealing body segments and a middle sealing body segment are fitted together to form a sealing body.

7. The sealing body as claimed in claim 6, wherein arranged in the middle regions of the outer sealing body segments are at least one latch with latching elements and a guiding strip and, on the middle sealing body segment to be attached, a guiding receptacle with mating latches for the latching elements.

8. The sealing body as claimed in claim 1, wherein the spring disk is likewise split in a way corresponding to the sealing body segments and encloses two half cable insertion openings arranged next to each other.

9. The sealing body as claimed in claim 1, wherein each sealing block has in the regions of the cable insertion openings conically extending depressions, preformed in a way corresponding to the centering spring elements, and preformed, half cable insertion openings.

10. The sealing body as claimed in claim 1, wherein latches with latching elements are arranged between the cable insertion openings and in each case at the outer edge regions of the sealing body segments, the latches respectively protruding beyond the separating planes and adapted to be inserted into the corresponding mating latches of the sealing body segment to be attached when the sealing body segments are joined together.

11. The sealing body as claimed in claim 1, wherein the sealing body segments have lugs for the fastening of connecting rails, which serves for the mutual positional fixing of two sealing bodies at the ends.

12. The sealing body as claimed in claim 1, wherein fastenings are arranged on the outer sides of the sealing body segments for fastening to a wall, mast or catenary wire.

13. The sealing body as claimed in claim 1, wherein filler plugs are inserted into unoccupied cable insertion openings.

14. The sealing body as claimed in claim 1, wherein unlocking elements are arranged at the latching elements.

15. The sealing body as claimed in claim 1, wherein a resilient centering device for cables is arranged at each cable insertion opening.

16. The sealing body as claimed in claim 15, wherein the centering device is formed by pointed tabs directed conically inward into the cable insertion opening.

17. A sealing body for longitudinally split cable fittings comprising a pair of outer body segments and a middle body segment positioned between the outer body segments, in the separating planes of which cable insertion openings and integrated cable holding devices are arranged, the outer sealing body segments having at least one integrally formed latching element that engages a respective guiding receptacle formed in the middle body segment for connecting the respective sealing body segments to one another in a latching manner, said sealing body further comprising deformable sealing blocks arranged in the regions of the cable insertion openings and having an outer peripheral groove for receiving pressure elements that bear against the sealing blocks to press and deform said sealing blocks against a cable inserted in the cable insertion openings and against the sealing body segments such that the sealing blocks seal the respective cable insertion openings, said sealing body further comprising at least one spring disk with spring elements directed conically into the cable insertion openings for deforming the sealing blocks and guides arranged in the region of each cable insertion opening for receiving sliding pieces adapted to be displaced perpendicularly with respect to the direction of cable insertion to hold an inserted cable.

* * * * *